Nov. 3, 1953
H. T. McNALLY
2,657,957
BEARING FOR DISK HARROWS
Filed June 25, 1951
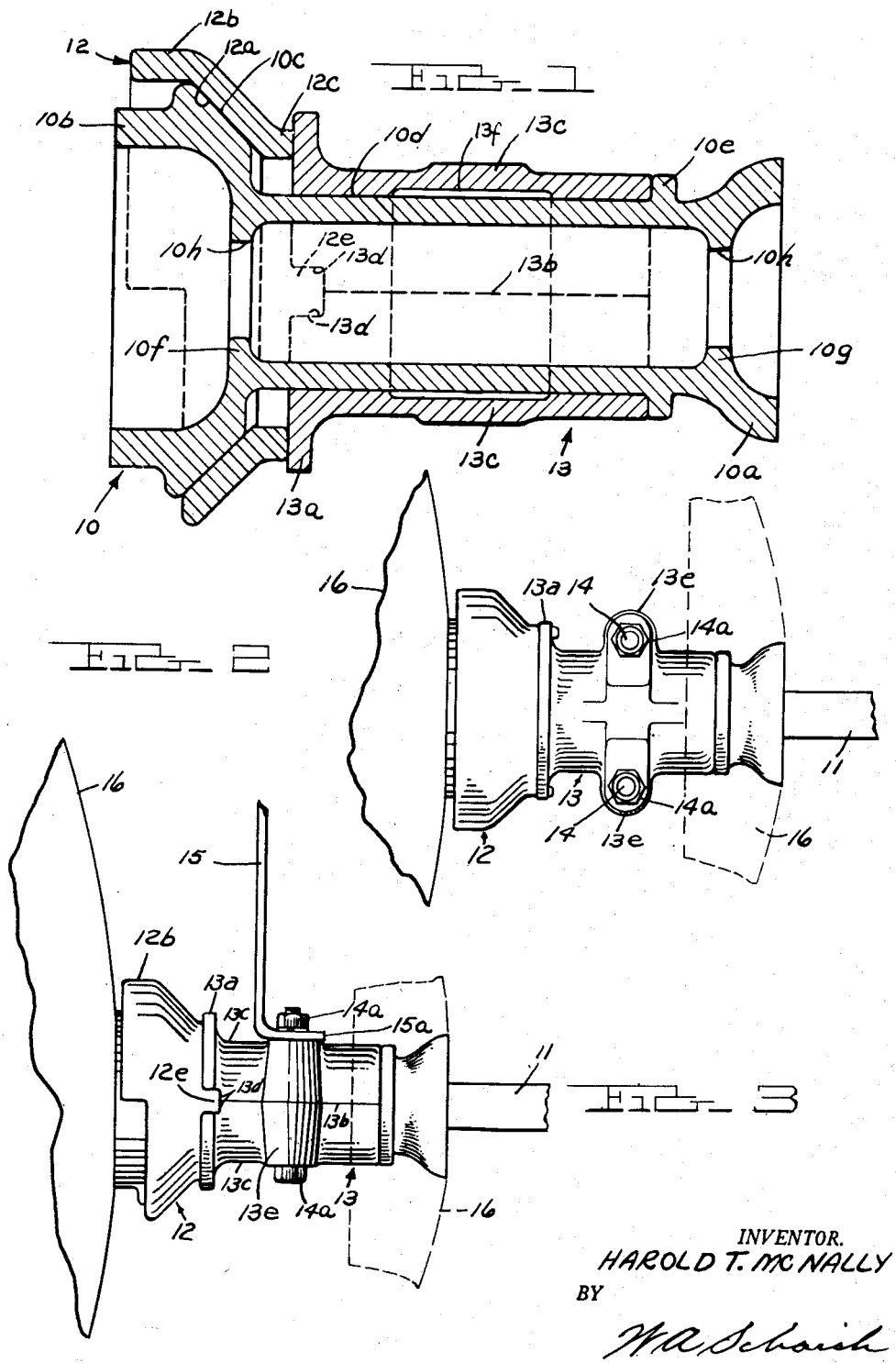
INVENTOR.
HAROLD T. McNALLY
BY
W. A. Schaich
ATTORNEY Patented Nov. 3, 1953

2,657,957

UNITED STATES PATENT OFFICE 2,657,957

BEARING FOR DISK HARROWS

Harold T. McNally, Detroit, Mich., assignor to Dearborn Motors Corporation, Birmingham, Mich., a corporation of Delaware Application June 25, 1951, Serial No. 233,321

5 Claims. (Cl. 308—19)

This invention relates to an improved bearing for disc type implements.

In disc type implements, particularly disc harrows and disc plows, thrust loads of considerable magnitude are encountered through the soil reaction on the discs of such implements. To adequately withstand such thrust loads, the bearings for this type of implement must have a large bearing area to prevent undue wear and rapid breakdown of the bearing. Bearings of the type used for disc implements also have to be of exceptionally rugged construction not only to withstand the thrusts to which they are subjected but to stand up under the abrasive conditions under which these bearings are operated. Of course, for manufacturing economy, such bearings should involve a minimum of easily assembled parts which may be inexpensively and conveniently replaced when worn.

It is, therefore, an object of this invention to provide an improved bearing construction for a disc type implement which will adequately take thrust as well as radial loads.

Another object of this invention is to provide an improved bearing construction for disc type implements which has a bearing element that is cheaply and readily replaceable when worn.

Still another object of this invention is to provide an improved bearing construction for disc type implements having a minimum number of parts, economical to manufacture, and easily assembled.

The specific nature of this invention, as well as other objects and advantages thereof, will become apparent to those skilled in the art from the following detailed description, taken in conjunction with the one sheet of drawings on which, by way of preferred example only, is illustrated one embodiment of this invention:

On the drawings:

Figure 1 is a longitudinal sectional view of the improved bearing constructed in accordance with this invention.

Figure 2 is a reduced scale plan view of the assembled bearing shown in Figure 1.

Figure 3 is a side elevational view of Figure 2.

As shown on the drawings:

Figure 1 illustrates, in assembled relationship, an improved bearing for disc implements comprising a spindle 10 which has a somewhat bell shaped, enlarged diameter right hand end 10a. The left hand end is similarly shaped as shown at 10b but of somewhat larger diameter. The enlarged diameter end 10b has a frustro-conical external bearing surface 10c integrally formed thereon for a purpose to be later described which slopes toward the central cylindrical portion 10d of spindle 10. The external bearing surface 10c is left in a hard condition by a subsequent chilling process whereby increased wear life thereof is obtained. Adjacent the bell mouthed end 10a of spindle 10, there is provided an integral annular ring 10e for a purpose to be later described. The interior of spindle 10 is hollow and inwardly projecting radial flanges 10f and 10g are respectively provided on the ends 10b and 10a of spindle 10 which define an axial bore 10h thereby permitting mounting of spindle 10 on a round gang bolt 11.

A collar 12 of generally frusto-conical configuration surrounds the enlarged diameter end of spindle 10. Collar 12 has an internal frustroconical bearing surface 12a which cooperates with the corresponding surface 10c of end 10b in bearing relationship. Collar 12 has an integral overhanging semi-cylindrical dirt shield 12b which overlies the upper portion of the enlarged diameter end 10b of spindle 10. The conical portion of collar 12 terminates in a cylindrical flange 12c and a pair of diametrically opposed lugs 12e are provided on the forward edge of cylindrical flange 12c as best shown in Figure 3. Lugs 12e are provided to engage corresponding notches in a split bearing member 13 as will be presently described. Collar 12 receives no subsequent heat treatment so that the internal conical surface 12a is not as hard as the conical surface 10c of spindle 10.

Split bearing member 13 is essentially a tubular member provided with a radially disposed integral edge flange 13a on its left hand end as best shown in Figure 1. Bearing member 13 is split along its horizontal axis as shown at 13b thereby defining two identical half sections 13c. The half sections 13c conveniently surround the cylindrical portion 10b of spindle 10 with the radial flange 13a in abutment with the edge of cylindrical flange 12c of collar 12. The right hand end of the split bearing member 13 abuts the integral annular ring 10b provided adjacent the enlarged end 10a of spindle 10. Each bearing half 13c is notched out as indicated at 13d to snugly receive the lugs 12e provided on collar 12. Bearing halves 13c respectively have a pair of integral bosses 13e on opposite sides thereof as shown in Figures 2 and 3. Each of the bosses 13e are vertically apertured (not shown) so that when the bearing halves are in assembled relation the vertical apertures will be respectively aligned to permit the insertion of a pair of bolts 14 therethrough whereby the bearing halves 13c are secured in bearing relationship to spindle 10. A disc gang hanger indicated by the numeral 15 has a horizontal arm portion 15a which is suitably vertically apertured so that bolts 14 may also be inserted through such arm to permit bearing 13 to be secured to hanger 15. A pair of nuts 14a respectively threaded onto the ends of bolts 14 secure the assembly together.

The relatively great bearing area of bearing member 13 on the cylindrical portion 10d of spindle 10 is relieved somewhat by an integrally formed annular groove 13f provided about the inner wall of such bearing member, thus seizure of the bearing is avoided. Conventional concave discs, indicated by the numeral 16, are mounted on the gang bolt 11, adjacent each end of spindle 10 in conventional fashion, and such gang bolt, when secured to the entire gang of discs, forces discs 16 tightly against the ends of spindle 10.

When utilizing the described bearing construction on a disc harrow or a disc plow, the gangs are so arranged that when discs are working in the soil, the thrust of the gangs will be directed substantially along the axis of the bearing. When such happens, the spindle 10 is forced to the right as shown in Figure 1. It should be kept in mind that bearing member 13 is held relatively stationary by bearing hanger 15, hence, the thrust forces on spindle 10 will be transmitted to collar 12 through the cooperation of the the conical surfaces 10c and 12a. Due to the relatively softer condition of collar 12, it is apparent that its conical surface 12a will wear much more rapidly than the surface 10c of spindle 10, hence, usually only collar 12 need be replaced to recondition the bearing.

The radial bearing load will be borne by the cylindrical portion 10b of spindle 10 which is rotating in bearing relationship with the interior surface of split bearing member 13. When this improved bearing construction is new, the end of bearing member 13 is in substantial contact with the annular ring 10e as shown in Figure 1. However, as the frustro-conical bearing surfaces 10c and 12a wear, the spindle 10 will then tend to be moved more towards the right so that annular ring 10e will no longer be in contact with the end of bearing member 13. However, as the thrust load is always in one direction and is adequately taken up by the frustro-conical bearing surfaces, such displacement is of no significance. The annular ring 10e, however, reduces excessive end play of the disc gang in the opposite direction from any thrust loads imparted when the gangs are not in angled working position.

From the foregoing description is is thus clearly apparent that there is here provided an improved bearing construction which is not only of simple and relatively inexpensive construction and easily assembled but also one which has ample bearing surfaces for both radial and thrust loads. Furthermore, the bearing is easily and cheaply reconditioned as the thrust collar, which receives the greatest wear, is expeditiously and inexpensively replaced.

It will, of course, be understood that many details of construction may be varied through a wide range without departing from the principles of this invention and it is, therefore, not the purpose to limit the patent granted hereon otherwise than necessitated by the scope of the appended claims.

I claim:

1. A bearing for a disc type implement comprising a spindle having an external conical bearing surface portion and a coaxial cylindrical bearing portion, a bearing member adjacent said conical portion and surrounding said spindle for rotatably supporting said cylindrical bearing portion of said spindle, a collar having an internal conical bearing surface constructed and arranged to surround said external conical portion in bearing relation, one end of said collar being in abutment with one end of said bearing member, and means on said bearing member for detachably engageable with said collar for preventing rotation of said collar relative to said bearing member.

2. A bearing for a disc harrow comprising a spindle having a head portion provided with an external conical surface, an axially split bearing member adapted to rotatably support said spindle, a thrust collar surrounding said head portion, said collar having an internal conical surface cooperating in bearing relationship with said external conical surface, one end of said bearing member being in abutment with said collar, and means on said collar engageable with said split bearing member whereby said collar is prevented from rotating.

3. A bearing for a disc harrow comprising a spindle having a head portion provided with an external conical surface, an axially split bearing member adapted to rotatably support said spindle, a radial edge flange on said bearing member, a thrust collar surrounding said head portion, said collar having an internal conical surface cooperating in bearing relationship with said external conical surface, said edge flange abutting the adjacent edge of said collar, and means on said collar engageable with said radial edge flange whereby rotation of said collar is prevented.

4. The combination defined in claim 3 wherein said means comprises at least one lug on said collar engageable with a corresponding notch in said radial edge flange.

5. A bearing for disc type implements having a gang bolt comprising in combination a spool-like spindle having an external frustro-conical surface on one end thereof, said spindle being mountable on a gang bolt, a thrust collar of substantially frustro-conical configuration mountable on said external conical surface, said collar having a pair of lug members, a split bearing member adapted to rotatably support said spindle relative to the implement, a radial edge flange on one end of said bearing member abutting said collar, said flange having a pair of notches constructed and arranged to receive said lugs to prevent rotation of said collar, and an annular ring on said spindle adjacent the other end of said bearing member for limiting axial movement of said bearing member and thrust collar relative to said spindle.

HAROLD T. McNALLY.

References Cited in the file of this patent
UNITED STATES PATENTS

| Number | Name | Date |
| --- | --- | --- |
| 243,807 | Smith | July 5, 1881 |
| 472,656 | Howard | Apr. 12, 1892 |